May 27, 1941.  T. F. SPACKMAN  2,243,609
AUTOMOBILE HEATER
Filed Sept. 22, 1938
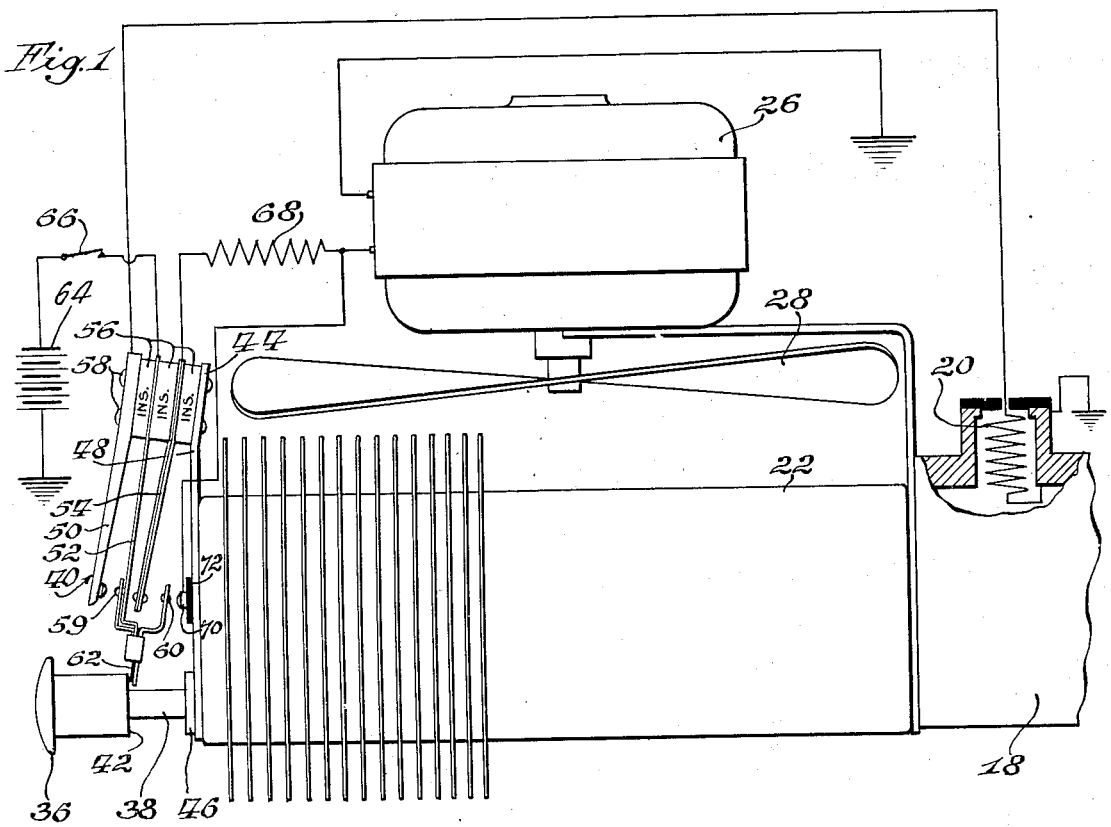
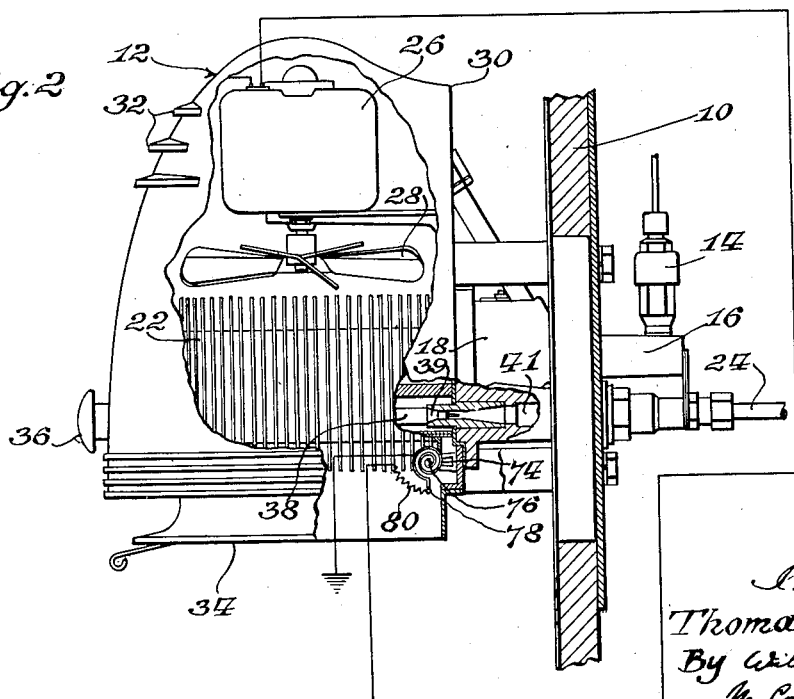
Inventor:
Thomas F. Spackman
By Williams, Bradbury
McCaleb & Hinkle
Attys.

Patented May 27, 1941

2,243,609

UNITED STATES PATENT OFFICE 2,243,609

AUTOMOBILE HEATER

Thomas F. Spackman, Chicago, Ill., assignor to Stewart-Warner Corporation, Chicago, Ill., a corporation of Virginia Application September 22, 1938, Serial No. 231,231

3 Claims. (Cl. 126—110)

The invention relates generally to forced circulation heaters for motor vehicles, and more particularly to improved controls for regulating the amount of air heated and circulated by said heater.

One of the objects of the present invention is to provide an improved heater wherein the speed of air circulated by the heater is controlled in relation to the heat units supplied to the air by the heater.

Another object of the invention is to provide a control for a heater which increases the air circulated through the heater gradually as the heater warms to its heat producing capacity.

Another object of the invention is to provide an improved switch construction for controlling the operation of an air circulating system of a motor vehicle heater in relation to the heat developed by the heater.

Another object of the invention is to limit the speed of air circulation over a heater until the heater has reached a predetermined temperature.

Another object of the invention is to provide an independent heat generating heater for motor vehicles wherein the operation of the air circulating means continues after the heat generation is stopped until the radiator is cooled.

Another object of the invention is to provide a device of the class described which is simple in construction and operation, thoroughly effective in its use, and inexpensive to manufacture and operate.

These being among the objects of the invention, other and further objects will become apparent from the drawing herein, the description relating thereto, and the appended claims.

Referring to the drawing:

Fig. 1 is a side elevation of the main units of the heater with the electrical controls therefor shown diagrammatically in idle position; and Fig. 2 is a side elevation partly in section of the heater as installed in an automotive vehicle illustrating another embodiment of the invention.

Referring now to the drawing in further detail, a dash 10 separating the engine compartment of a motor vehicle from the passenger compartment is shown with the heater 12 mounted thereon, upon the inside of the passenger compartment.

Reference may be had to the co-pending application of Henry J. De N. McCollum, Serial No. 61,213 filed January 28, 1936, for the structural characteristics of the heater 12 wherein, briefly, an air and fuel mixture supplied by the carburetor 14 is drawn through the mixing chamber 16 into the combustion chamber 18 where the mixture is ignited by the ignition coil 20 and then burns continuously to form hot gases which in turn are drawn into the radiator 22 and discharged through a tube 24 into the intake manifold (not shown) of the conventional internal combustion engine, under the force of the vacuum created in said intake manifold.

A motor 26 and a fan 28 driven thereby are located inside a shell 30 which houses the radiator 22 of the heater 12, and air drawn into the shell through the openings 32 is propelled over the radiator 22 in heat exchange relationship therewith and returned to the interior of the passenger compartment through the bell-like deflector 34.

Referring to Fig. 1, the generation of heat in heater is controlled by the button handle 36 which is secured to a stem 38. The stem 38 controls a valve 39, as more particularly described in said co-pending application, which closes the vacuum passageway 41 leading to the intake manifold when the button handle 36 is pushed to its innermost position as shown in Fig. 1. A switch means 40 is provided to control the supply of current to the igniter 20 and fan motor 26 and in turn is controlled by a shoulder 42 upon the handle 36 as an incident to the movement of the handle 36 in closing and opening the valve 39. The switch means 40 comprises a mounting plate 44, the lower end of which is apertured to receive a bushing 46 by which the mounting plate is rigidly secured to the radiator 22.

The upper end of the switch mounting plate 44 is bent at a slight angle to the remaining portion of the plate as at 48 and has secured thereto a rigid contact arm 50, a spring arm 52, and a bimetal thermostatic element 54. The arms 50, 52, and the thermostatic element 54 are insulated from each other and from the mounting plate 44 by blocks of insulation 56 and all the parts are held in assembled relationship by rivets 58 which are insulated from all metal parts that are not grounded to the radiator 22.

The spring arm 52 carries two contacts 59 and 60 which are spaced from each other and located upon opposite sides of the thermostatic element 54. Beyond these contacts, the arm 52 terminates in a bent portion providing a finger 62 which cooperates with the shoulder 42 of the handle 36. Another contact 70 is mounted upon the plate 44, and located to register with the contact 60 when the spring arm is moved towards the radiator. The contact 70 is electrically insulated from the plate 44 by an insulating plate 72.

The contact arm 50 is in circuit with the igniter 20, and the spring arm 52 is connected in circuit with the battery 64, through the conventional ignition switch 66. The thermostatic element 54 is connected in series with the motor 26 and a resistance 68, and the contact 70 is connected in direct circuit with the motor 26, shunting the resistance coil 68.

The spring arm 52 is sprung to press towards the arm 50, and is moved in the opposite direction towards the radiator 22 in one of two ways: either by the shoulder 42 pressing against the finger 62 when the valve 39 is closed, or by the thermostatic element 54 engaging and forcing the contact 60 when the element 54 flexes under an increase of temperature.

In this way, the spring arm 52 moves under its own tension to make contact with the arm 50 and energize the ignition coil 20 simultaneously with the start of the flow of combustible elements induced by opening the valve 39 when the handle 36 is moved outwardly. Then when combustion is under way, the thermostatic element 54 will be subjected to mounting temperatures. The thermostatic element will flex inwardly, engage the contact 60 to start the motor 26 at a slow speed controlled by the resistance 68, and break the contact with the arm 50 to remove the igniter from operation and economize on electricity.

As the temperature continues to rise in the radiator 22, the thermostatic element will continue to flex farther and farther until it moves the spring arm 52 far enough to make the contact between the contacts 60 and 70 at which time the resistance 68 is shunted and the slowly running motor 26 is advanced to full speed, thus bringing the heater into full operation.

In order to cause the heater to cease operation, the handle 36 is pushed in to close the valve 39. This shuts off the vacuum supply and combustion stops. However, since the motor 26 is controlled by the thermostatic element 54, the motor 26 will continue to run until the radiator 22 is cooled by the air being forced over it. First, the motor will continue to run fast, then as the thermostatic element straightens upon cooling, the resistance coil will be returned to operation when the contact between the contacts 60 and 70 are broken. Thereupon, the motor 26 will run at a slow speed until the spring arm finger 62 engages the shoulder 42 and the thermostatic element relinquishes contact with the contact 60. The motor then stops and the heater is returned to complete idleness.

In this way the speed of air circulated by the heater is graduated to the heat available in the radiator and when the heater is shut off, the motor continues to run until the radiator is again cool.

Referring to Fig. 2, another embodiment of the invention is provided wherein a spirally wound thermostat 74 is employed and works independently of the handle 36 to regulate the speed of operation of the motor 26. The spirally wound thermostat is disposed adjacent the radiator 22 within the path of the air flowing from the radiator as driven by the fan 28. The inner end of the thermostat 74 is rigidly supported on a pin 76 and the outer end carries a contact 78 which it moves back and forth along a resistance coil 80 as the thermostat flexes under the influence and in direct relationship with the heat developed in the radiator 22.

The resistance coil 80 and the flex of the thermostat 74 are so related that increases in temperature will reduce the resistance in the electrical circuit 82 which controls the motor. Thus, as the heat produced by the radiator increases, the speed of the motor 26 will increase in direct relationship therewith. The motor 26 is thereby gradually brought into full operation after the valve 39 has been opened and gradually removed from operation when the valve is again closed.

Thus, a control for a heater is provided wherein the speed of air circulation is regulated and restricted until the radiator in the heater has reached a predetermined temperature and the air circulation of the heater is advanced progressively as the heater warms up to its heat producing capacity.

Consequently, although several embodiments of the invention have been shown and described herein, it will be apparent to those skilled in the art that various and further uses, modifications and changes may be made without departing from the spirit and substance of the invention, the scope of which is commensurate with the appended claims.

What is claimed is:

1. In an automobile heater of the internal combustion type, the combination of a combustion chamber, means for supplying a mixture of fuel and air to said combustion chamber, means for igniting said mixture in said combustion chamber, a radiator connected to receive products of combustion from said combustion chamber, a fan for circulating air over said radiator, a motor driving said fan, manually operable means for controlling the flow of the products of combustion through said radiator, a switch for controlling the flow of current to said igniting means, a normally open circuit including a resistance for supplying electrical current to said fan motor, means operable by said manually operable means to close said igniting means switch, a thermostatic element for opening said igniting means switch and closing said resistance and fan motor circuit, and means controlled by said thermostatic element for shunting said resistance when said radiator approaches substantially normal operating temperature.

2. In an automobile heater of the internal combustion type, the combination of a combustion chamber, means for supplying a mixture of fuel and air to said combustion chamber, means for igniting said mixture in said combustion chamber, a radiator connected to receive products of combustion from said combustion chamber, a fan for circulating air over said radiator, a motor driving said fan, manually operable means for controlling the flow of the products of combustion through said radiator, a switch for controlling the flow of current to said igniting means, a normally open circuit including a resistance for supplying electrical current to said fan motor, means operable by said manually operable means to close said igniting means switch, and a thermostatic element for opening said igniting means switch and closing said normally open circuit when said radiator attains a predetermined temperature, and shunting the resistance in said circuit when said radiator attains normal operating temperature.

3. In an automobile heater of the internal combustion type, the combination of a valve for controlling the flow of hot gases of combustion through the heater, a manually operable member for actuating said valve, an igniter switch, temperature responsive means in position to be heated when the heater is in operation, means controlled by said manually operable member to close said igniter switch when said manually operable member is moved to valve-opening position, a fan motor, a circuit including a resistance for supplying energizing current to said motor, a slow speed switch in said circuit, a circuit including a high speed switch and shunting said resistance, and temperature responsive means operable as the temperature of said heater increases sequentially to open said igniter switch, close said slow speed switch, and close said high speed switch.

THOMAS F. SPACKMAN.